United States Patent [19]

Hirota et al.

[11] Patent Number: 6,034,732
[45] Date of Patent: Mar. 7, 2000

[54] DIGITAL BROADCAST RECEIVING TERMINAL APPARATUS

[75] Inventors: Atsushi Hirota; Noriya Sakamoto; Masahiro Yamada, all of Kanagawa-ken, Japan

[73] Assignee: Kabushiki Kaisha Toshiba, Kawasaki, Japan

[21] Appl. No.: 08/782,049

[22] Filed: Jan. 10, 1997

[30] Foreign Application Priority Data

Jan. 12, 1996 [JP] Japan ..................... 8-004119

[51] Int. Cl.⁷ ........................................ H04N 7/01
[52] U.S. Cl. ................... 348/441; 348/555; 348/556; 348/726; 375/316
[58] Field of Search ..................... 348/554, 555, 348/556, 558, 705, 706, 726, 441, 445, 446, 448; 375/316, 340; H04N 7/101

[56] References Cited

U.S. PATENT DOCUMENTS

| | | | |
|---|---|---|---|
| 5,400,077 | 3/1995 | Cookson | 348/556 |
| 5,530,484 | 6/1996 | Bhatt | 348/556 |
| 5,532,748 | 7/1996 | Naipally | 348/554 |
| 5,555,097 | 9/1996 | Joung | 348/441 |
| 5,666,170 | 9/1997 | Steward | 348/726 |
| 5,801,780 | 9/1998 | Schaumont | 348/441 |
| 5,801,781 | 9/1998 | Hiroshima | 348/426 |

FOREIGN PATENT DOCUMENTS

| | | |
|---|---|---|
| 710021A2 | 5/1996 | European Pat. Off. . |
| 749244A2 | 12/1996 | European Pat. Off. . |
| 95/27977 | 10/1995 | WIPO . |

OTHER PUBLICATIONS

Texas Instrument "TSB11C01 13 P1394 Triple–Cable Tranceiver/Arbiter" Data Manual; no P1394 being renumbered to "IEEE 1394 as referenced in the specification of this application.

Texas Instrument "TSB12C01—P1394 High–Speed Serial–Bus Link–Layer Controller" Data Manual, now P1394 being also renumbered to "IEEE 1934.

*Primary Examiner*—John K. Peng
*Assistant Examiner*—Wesner Sajous
*Attorney, Agent, or Firm*—Pillsbury Madison & Sutro LLP

[57] ABSTRACT

Digital broadcast receiving terminal apparatus which receives multi-channel digital broadcast signals to record the huge capacity without deteriorating the quality of signals and to visualize the digital broadcasting. The outputs form the error correction decoding circus 4 are applied to the TS processor 12 via the switches SW 1 and SW 2, at the same time they are applied to the recording program selector 11. The recording program selector 11 applies the encoded data of the predetermined program to the digital interface 13, the digital interface 13 inputs and outputs the encoded data through bus in the IEEE1394 specification for example. Thus, the encoded data are applied to the external equipment and recorded as they are, and the degradation of the quality can be prevented. The switches SW 1 and SW 2 changes the receiving signals and the outputs from the digital interface 13 and applies them to the TS processor 12. The TS processor 12 depacketizes the input encoded data. Therefore, the image reproduction based on the receiving signals or the outputs from the external equipment can be carried out.

3 Claims, 8 Drawing Sheets

DIGITAL BROADCAST RECEIVING TERMINAL APPARATUS

FIELD OF THE INVENTION

The present invention relates to a digital broadcast receiving terminal apparatus which receives the multi-channel digital broadcast signals.

BACKGROUND OF THE INVENTION

Recently, by the establishment of the high efftciency coding technology such as an MPEG (Moving Picture Experts Group) 2, the digital processing of the image is advanced, and further, in the television broadcasting the digital processing is being studied. In the digital broadcasting, by utilizing the high efficiency coding technology or the digital modulation/demodulation technology it is expected that the signals of the service types such as the video data, the audio data or each kinds of data will be multiplexed transmitted.

In the MPEG 2, two kinds of signal multiplex formats, PS (Program Steam) and TS (Transport Stream) are defined. Especially, the TS system copes with the transmission error, at the same time since it has capability of multiplexing and

FIELD OF THE INVENTION

The present invention relates to a digital broadcast receiving terminal apparatus which receives the multi-channel digital broadcast signals.

BACKGROUND OF THE INVENTION

Recently, by the establishment of the high efficiency coding technology such as an MPEG (Moving Picture Experts Group) 2, the digital processing of the image is advanced, and further, in the television broadcasting the digital processing is being studied. In the digital broadcasting, by utilizing the high efficiency coding technology or the digital modulation/demodulation technology it is expected that the signals of the service types such as the video data, the audio data or each kinds of data will be multiplexed transmitted.

In the MPEG 2, two kinds of signal multiplex formats, PS (Program Steam) and TS (Transport Stream) are defined. Especially, the TS system copes with the transmission error, at the same time since it has capability of multiplexing and transmitting a plurality of programs it meets to the multi-channel solution and the multimedia-solution in the telecommunication or the storage media.

In the TS system, in order to make the time-division multiplexing of a plurality of image signals, audio signals, and data easy the transmission data are transmitted by units of the fixed-length packet. One packet comprises of same type of data, wherein the identification information which differ from each data is recorded in the header. The receiver which receives such digital broadcast signals and decodes them is called like set-top box or IRD (Integrated Receiver Decoder).

Figure 11:
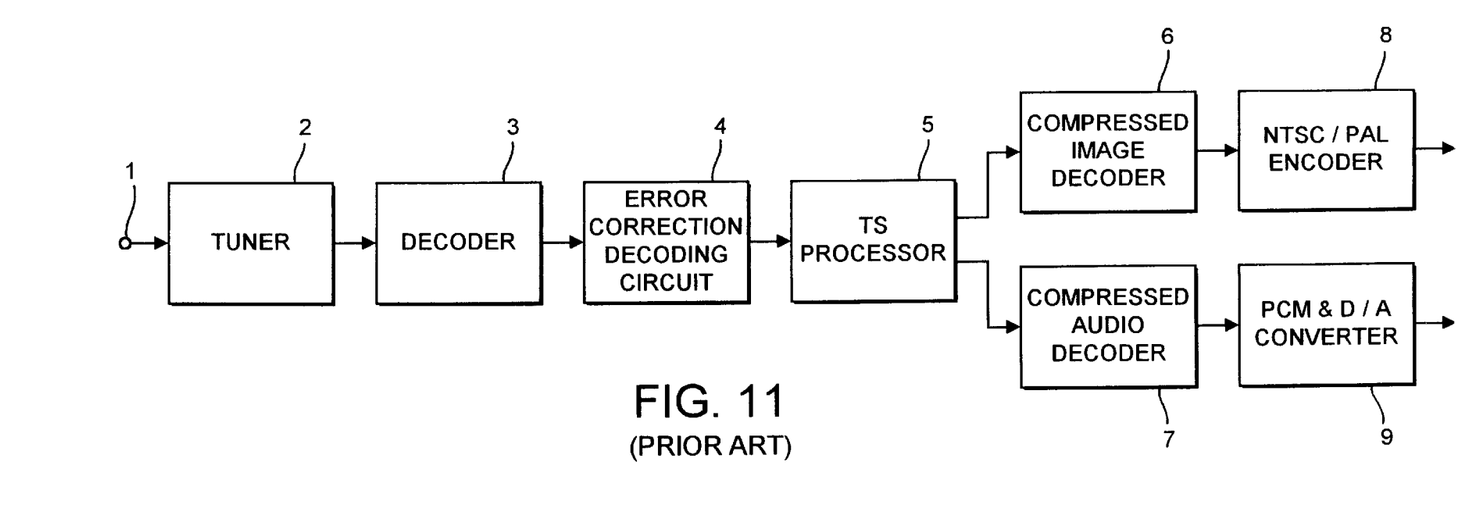
FIG. 11 is a block diagram for showing the conventional digital broadcast receiving terminal apparatus.

FIG. 11 is a block diagram showing such a IRD.

RF (radio frequency) broadcast signals input via an input terminal 1 are applied to a tuner 2. The tuner 2 selects the predetermined transmission frequency-band signals from the input broadcast signals and outputs them to a decoder 3. The decoder 3 performs the A/D conversion to the signals of the selected channels and digitally decoding to them. Here, as the modulation and demodulation in the transmitter section and the receiver section, for instance, the modulation/demodulation technologies such as QAM or QPS are employed.

The signals demodulated in the decoder 3 are applied to an error correction decoding circuit 4. The error correction decoding circuit 4 corrects the errors of the demodulated signals by utilizing error correction codes contained in the decoded signals. As the error correction codes, for instance, a convolution code such as a Viterbi code or RS (reed Solomon) code are utilized. The outputs from the error correction decoding circuit 4 are supplied to a TS processor 5.

As mentioned above, in the TS system a plurality of services (broadcast programs) are multiplexed and transmitted. The TS processor 5 selects a predetermined service from a plurality of multiplexed services and demultiplexing it. For instance, the TS processor 5 separates the image data from the input signals and outputs them to a compressed image decoder 6, and also separates the audio data and outputs them to a compressed audio decoder 7.

The image data and audio data from the TS processor 5 are compressed by the MPEG 2 standard for example. The compressed image decoder 6 decodes the coded image data and obtains the digital luminance data and the digital color-difference data Cb, Cr so as to output them to a NTSC/PAL encoder 8 as components signals. Further, the audio data are decoded in the compressed audio decoder 7 and supplied to a PCM and D/A converter 9.

The image data decoded in the NTSC/PAL encoder 8 are converted into the NTSC system or PAL system composite image signals and output. Further the decoded audio data are converted into analog audio signals in the PCM and D/A converter 9 and output.

It will be thought that the digital broadcast signals of such multi-channel are recorded by VTR (Video Tape Recorder). In this case, there will be two ways such as utilizing the analog VTR which comes into widespread use to the general consumers or utilizing the business-application digital VTR. When utilizing the analog VTR the analog outputs from the NTSC/PAL encoder 8 or PCM and D/A converter 9 as shown in FIG. 11 are supplied to the VTR and recorded. In this case, there is an advantage of using the VTR which comes into wide spread use generally, however, there is a disadvantage that the image quality degradation is not avoided since the conversion from the digital to the analog effects to the quality.

When the business-application digital VTR is used the digital component signals from the compressed image decoder 6 and the compressed audio decoder 7 are applied to the digital VTR and recorded. However, there is a drawback that extremely enormous capacity of recording medium are required for long-duration recording since the amounts of information of the non-compressed digital component signals are generally enormous. Further there is also a drawback that such a digital VTR is extremely expensive.

As mentioned above, conventionally there was a problem that the inexpensive apparatus which performs long-duration recording without the quality degradation of the broadcast signal did not exist.

SUMMARY OF THE INVENTION

The present invention has been made in view of the problem shown above and it is the object of the present invention to provide a digital broadcast receiving terminal apparatus capable of long-duration recording without the quality degradation of digital broadcast signals, and further of being constructed inexpensively.

The digital broadcast receiving terminal apparatus according to claim 1 of the present invention characterized by that it is provided with, digital interface means for converting demodulated digital broadcast signals into digital signals of the same signal formats as predetermined digital signals and outputting them by converting the signal formats between the demodulated digital broadcast signals and the predetermined digital signals, and also for converting the predetermined digital signals into the signals which have the same signal formats as the demodulated digital broadcast signals and outputting them, transport processing means, where the demodulated digital broadcast signals or the outputs from the digital interface means are input, for selecting predetermined programs from the input signals and demultiplexing them so as to output elements of the selected programs, and decoding means for decoding the outputs of the transport processing means.

The digital broadcast receiving terminal apparatus according to claim 3 of the present invention characterized by that it is provided with, transport processing means, where demodulated digital broadcast signals are input, which is able to output elements of predetermined programs selected from the digital broadcast signals and demultiplexed as external outputs by being converted into predetermined signal formats, and to output digital signals having the same signal formats as the external outputs by being converted into the same signal formats as the demodulated digital broadcast signals, for obtaining reproducing outputs from the elements of the predetermined programs selected from the demodulated digital broadcast signals and demultiplexed or obtaining reproduction outputs from the digital signals converted into that having the same signal formats as the demodulated digital broadcast signals, and compression decoding means for decoding the reproducing outputs from the transport processing means.

In claim 1 of the present invention, the demodulated digital broadcast signals can be converted into the predetermined signal formats and output to the external equipment. The transport processing means selects the predetermined program from the outputs of the digital broadcast signals or the digital interface means and demultiplexes it. The encoded data from the transport processing means are applied to the decoding means and decoded there.

In claim 3 of the present invention, the digital broadcast signals demodulated in the transport processing means are converted into predetermined signal formats and output as the external outputs, and at the same time from which a predetermined programs are selected, demultiplexed and output as the reproducing outputs. The encoded data from the transport processing means to be reproduced are applied to the decoding means and decoded there.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
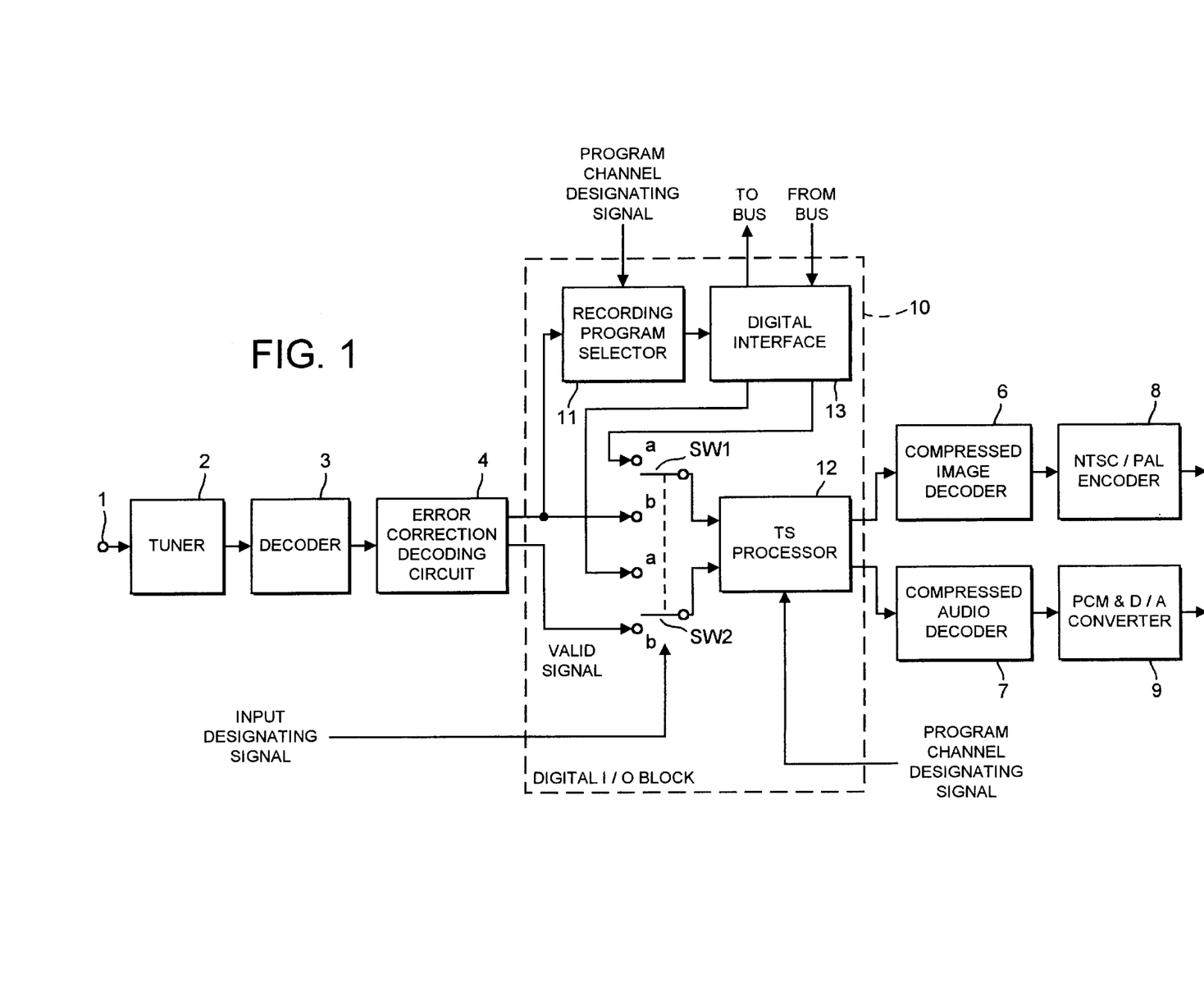
FIG. 1 is a block diagram showing one embodiment of the digital broadcast receiving terminal apparatus according to the present invention.

Embodiments of the present invention will be explained hereinafter referring to the drawings. FIG. 1 is a block diagrams showing one embodiment of the digital broadcast receiving terminal apparatus according to the present invention. In FIG. 1 the same components as those shown in FIG. 11 are assigned with the same marks.

To the input terminal 1 the RF signals which is constructed as the streams based on the MPEG2 standard TS multiplex scheme by the high efficiency coding and modulated by the modulating systems such as the QAM or QPSK are input. The RF signals are applied to the tuner 2. The tuner 2 selects the predetermined transmission frequency-band signals from the input broadcast signals and outputs them to the decoder 3.

The decoder 3 performs the A/D conversion to the signals of the selected channels then, it demodulates the broadcast signals by the digital demodulation according to the demodulation technology at the transmitter section. The signals demodulated in the decoder 3 are applied to the error correction decoding circuit 4. The error correction decoding circuit 4 corrects the errors of the decoded signals by utilizing error correction codes which are added to the program data at the transmitter section. As the error correction code, for instance, a convolution code such as a Viterbi code or an RS (Reed-Solomon) code is used. The outputs of the error correction decoding circuit 4 are packetized encoded data of the program data. The encoded data are supplied to the digital input/output block 10.

The digital input/output block 10 comprised of a switches SW1, SW2, a recording program selector 11, a TS processor 12 and a digital interface 13. The digital input/output block 10 is capable of outputting the encoded data from the error correction decoding circuit 4 to the external equipment (not shown). The digital input/output block 10 selectively processes and visualizes the encoded data from the error correction decoding circuit 4 or that from the external equipment.

That is, the encoded data from the error correction decoding circuit 4 are supplied to the terminal b of the switch SW1 and also to the recording program selector 11. The recording program selector 11 selects the programs which are based on the program channel designating signals from a plurality of programs containing the encoded data, and outputs them to the digital interface 13. The digital interface 13 converts the outputs from the recording program selector 11 into predetermined formats so as to output them as the external outputs over the bus (not shown). Further, the digital interface 13 supplies the encoded data input via the bus (not shown) and its corresponding control signals to each terminals a, a of the switches SW1 and SW2.

Figure 2:
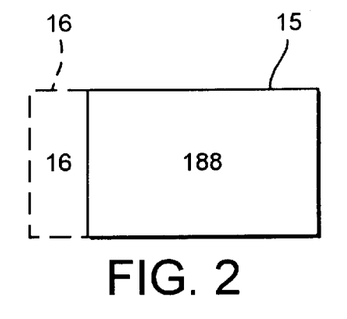
FIG. 2 is a flow chart for explaining the TS packet.

To the terminal b of the switch SW2 a valid signal is also input. The valid signal, which is a control signal for showing a valid portion among the outputs from the error correction decoding circuit 4 is supplied from the error correction decoding circuit 4. FIGS. 2 and 3 are explaining the valid portions of the encoded data. FIG. 2 is an explaining diagram for illustrating the TS packet, and FIG. 3 is a timing chart for illustrating the valid signal.

The packet length of the TS packet 15 in the MPEG 2 standard TS system is 188 bytes fixed-length. As shown in FIG. 2, for instance 16 bytes length error correction code 16 is added to in just front of the TS packet 15. The error correction decoding circuit 4 outputs only the TS packet 15 except to the error correction code 16 as the encoded data.

Figure 3A:
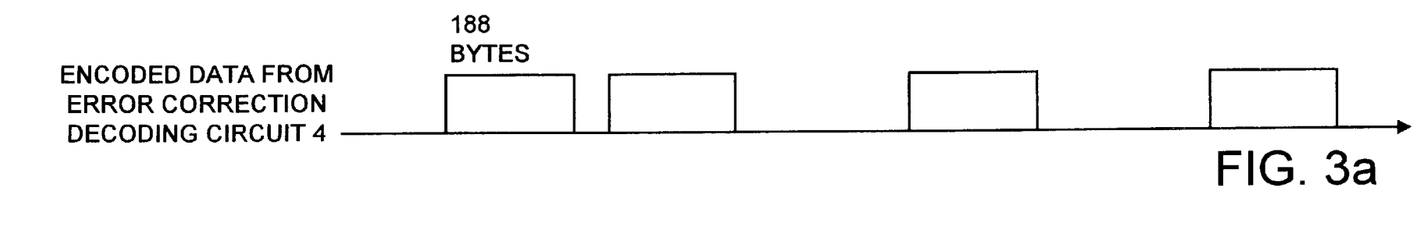
FIG. 3 is a timing chart for explaining the valid portion of the encoded data.
Figure 3B:
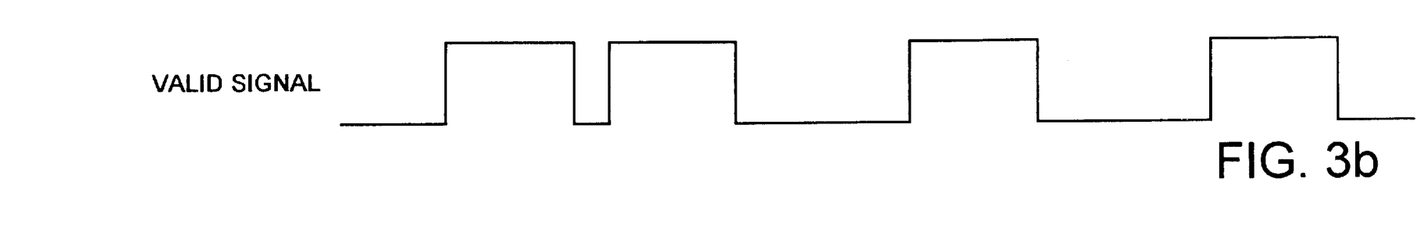

FIG. 3a is showing the encoded data from the error correction decoding circuit 4. FIG. 3b is showing the valid signal. Since the error correction code is eliminated from the outputs of error correction decoding circuit 4, even if the packet of the input broadcast signal is consecutive, there will be 16 bytes vacancies between each two TS packets from the error correction decoding circuit 4. The valid signal is showing the position where the valid 188 bytes packet data exists.

In FIG. 1 the switches SW1 and SW2, which change the terminals a or b by interchanged based on the input designating signals, select terminals b, b in case of carrying out the image reproduction based on broadcast receiving signals, and select terminals a, a in case of carrying out the image reproduction based on reproducing signals from the VTR. The signals from the switches SW1 and SW2 are supplied to the TS processor 12.

As described above, the TS packet is corresponding to the multi-program to select the predetermined programs from a plurality of programs which are performed time division multiplex transmission at the decoding time. For this selection mentioned above, the TS packet is transmitted by adding the header to the end of the payload which transmits encoded data and information. 4 bytes among 188 bytes are called as a header. A PES (Packetized Elementary Stream) packet comprised of some members of TS packets.

The header comprises of sequentially arranged sync-byte which is arranged at the leading edge, a transport packed error indicator showing the existence or non-existence of bit error, a PES packet start indicator showing the start of PES packet, a transport priority showing the degree of importance of the packet, a transport scrambling control showing the existence or non-existence of the scramble, an adaptation field control showing the existence or non-existence of the adaptation field, and a continuity counter showing the continuance of the identical PID. Here, the 8 bytes synch-byte at the leading edge of the packet is a specific code, and it is always 47 by hexadecimal number.

The TS processor 12 has a function for extracting the identical PID from the sequentially input PIDs by referring to the PID, so as to decode only predetermined programs from the transmitted data.

Further, the PID in each packet is arbitrarily establishable under the given control of the transmitter section, which is necessary to be made the correspondence of the PID with the information of some kinds shown by the PID clear. Therefor, In the transport stream an identification table (PTM) which describes the lists of the PID is transmitted by specific TS packet (program map table PMT transmission packet), at the same time the TS packet (program association table PAT packet) showing the PID of the PMT transmission packet is also transmitted. The PID of the PAT packet is established at 0. Here, the PAT and PMT transmission packets are transmitted at specific intervals. The TS processor 12 identifies the relationship between the PID and the kinds of transmission data by referencing to the PMT. The TS processor 12, to which the program channel designating signals according to the user-operation are applied, separates programs based on the program channel designating signals, depacketizes and outputs them.

Among the outputs from the TS processor 12, the image data are supplied to the compressed image decoder 6, and the audio data are supplied to the compressed audio decoder 7. The image data and the audio data from the TS processor 12 are subjected to the high efficiency coding operation. The compressed image decoder 6 decodes the coded image data, and outputs the digital luminance data Y and digital color-difference data Cb and Cr to the NTSC/PAL encoder 8 as the component signals. Further, the compressed audio decoder 7 decodes the audio data from the TS processor 12 and outputs them to the PCM and D/A converter 9.

The NTSC/PAL encoder 8 converts the decoded image data into the composite image signals of NTSC system or PAL system so as to output. Further, the PCM and D/A converter 9 converts the decoded audio data into the analog audio signals so as to output.

Figure 4:
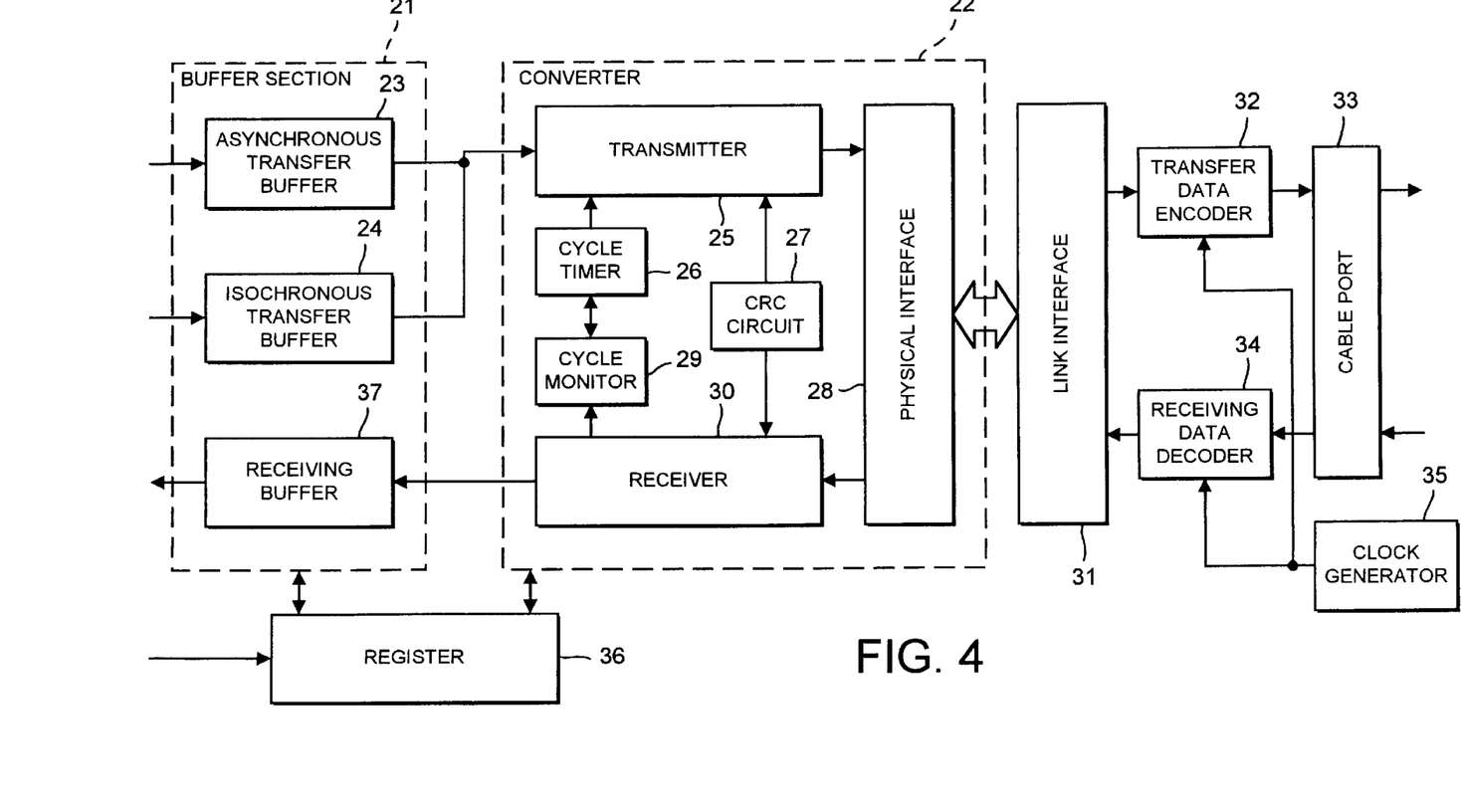
FIG. 4 is a block diagram showing the concrete structure of the digital interface 13 shown in FIG. 1.

In this embodiment, as the digital interface 13 IEEE1394 standard serial interface is employed for example. FIG. 4 is a block diagram showing the concrete structure of the digital interface 13 shown in FIG. 1, and also showing the standard structure of IEEE1394.

The IEEE1394 is capable of multiplex transmission of a plurality of channels and isochronous transmission which guarantees to transmit the image and audio data within a given time. Further, the IEEE1394 is capable of employing a daisy-chaining and a tree-topology. Since the IEEE1394 is capable of high speed transmission at maximum 400 Mbps (bit/second) much attention is focused on it as an expensive peripheral interface suitable for the multimedia application.

In IEEE, as the IEEE1394 specification a physical layer and a link layer are defined. In the physical layer the coding system of the serial signals and the electric specification are regulated for defining the bus arbitration performing the arbitration of the bus mastership or notification to whole buses according to the traffic condition. In the link layer low level protocol related to the data read-out and the write-in.

The digital interface 13 has the structure which meets to the link layer and the physical layer as same as the IEEE1394. The link layer comprised of a buffer section 21 and a converter 22. The buffer section 21 comprised of an asynchronous transfer buffer 23 and a transmission buffer having an isochronous transfer buffer 24. The buffer section 21 is connected to a data processing section (not shown), and a cable port 33 of the physical layer is connected to other node of external equipment through the bus (not shown either).

At the transmitting time, the transmission data from one of the asynchronous transfer buffer 23 or the isochronous transfer buffer 24 are supplied to a transmitter 25 of the converter 22. The transmitter 25 packetizes the input transmission data by a specific format. A CRC circuit 27 generates 32 bits CRC (Cyclic Redundancy Check) codes for error detection to both the header of the packet and the data. The physical interface 28 transmits the packet data to which the CRC code is added to the physical layer.

The link interface 31 applies the transmission data from the physical interface 28 to a transfer data encoder 32. To the transfer data encoder 32 the clock from a clock generator 35 of also applied. The transfer data encoder 32 encodes the input transfer data, then outputs them to a cable port 33 with a strobe signals.

On the other hand, in the receiving time, the encode data and strobe signals input through the physical cable port 33 are applied to a receiving data decoder 34. The receiving data decoder 34 decodes the encode data and supplies them to a receiver 30 thorough the link interface 31 and the physical interface 28. Here, the receiving data decoder 34 reproduces the receiving clock by the encode data and the strove signals.

The receiver 30 detects whether the information showing a reply node containing the packet data from a request node (initiator note) shows its own node or not. If the data opposites to its own node, the CRC code of the packet is checked in the CRC circuit 27. If there are any error the receiver 30 decides the packet data containing the header and supplied it to the receiving buffer 37. In case that there are some errors, the receiver 30 annuls the header and disregards other data. The data stored in the receiving buffer 37 are supplied to the data processing sector (not shown).

Figure 5:
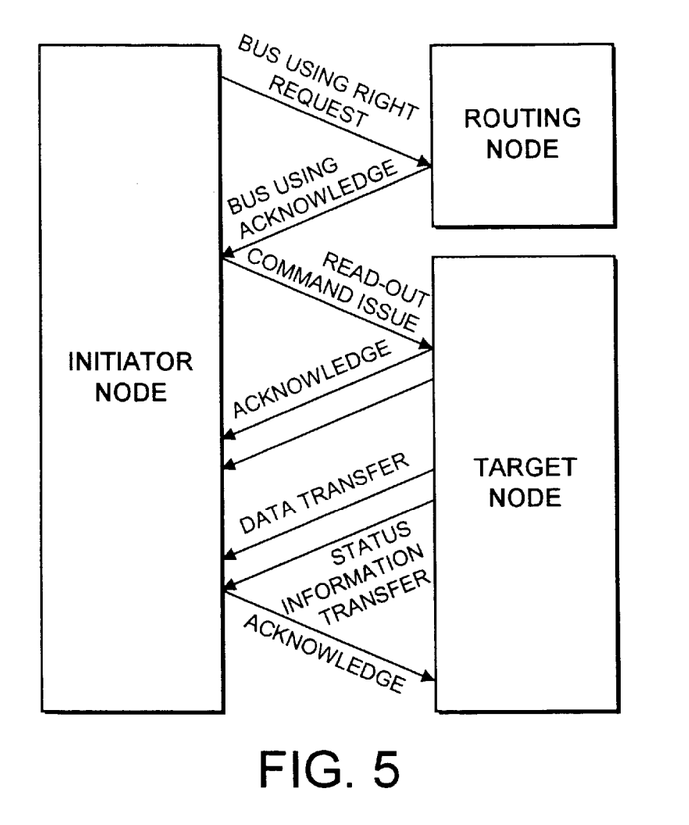
FIG. 5 is a flow chart for showing the transmission protocol process in the link layer.

FIG. 5 is a flow chart for showing the transmission protocol procedure in the link layer.

In IEEE1394, the master-slave membership is decided by transmitting the signals among each equipments of each nodes via the buses. One of them becomes the master equipment and others become the slave equipments. The master equipment decides the ID number of each equipment and informs them to these equipments. Here, such an operation mentioned above is as same as that performed in the interface such as a SCSI. As mentioned above, the data transmitted through the bus has the packet structure, in which header the ID for identifying the transmitter is inserted. Further, in ID (destination ID) for showing which equipments receive the transmission data is also inserted in the packet header.

After the bus reset operations are over, the bus arbitration is performed before the transmission of the data. As shown in FIBRE 5 the initietor node (request origin node) issues a request command for the bus using right to a routing node, at first. The routing node consents the bus using to the initietor node. Next, the inicietor node informs that the transfer rate of the data packet is one of 100, 200 or 400 Mbps to the target node (requested node), then it issues read-out command for example. To the read-out command, the darget node returns an acknowledgement, so that the data transmission is started. When the data transmission is over, the darget node transmits a status information, and initietor node returns the acknowledgement. Therefor, a series of process will be over.

Figure 6:
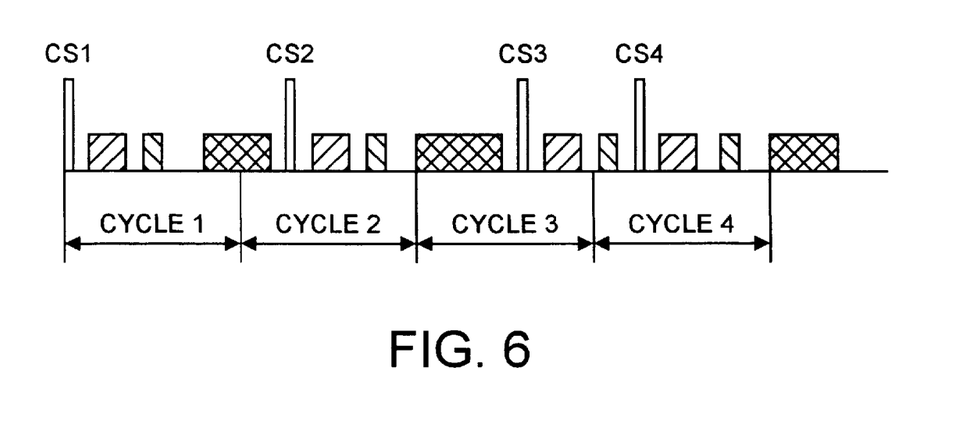
FIG. 6 is a flow chart for explaining the isochronous transfer.

FIG. 6 is a flow chart for explaining the isochronous transfer, it is showing the data transmitted through the bus.

As described above, in the isochronous transfer the data is transferred over the bus at a specific cycle (isochronos cycle). The isochronos cycle is 125 $\mu$s. The routing node controls the isoronous transfer by working as a cycle master. That is, the cycle master sets the time of each node to the cycle time which is expressed by 32 bits, at first. The synchronism of each node is took based on the cycle time. Next, the cycle master, as shown in FIG. 6, transmits so called cycle start packet-packets CSW 1, CSW 2, . . . at the rate of one time 125 $\mu$s.

After the initietor node receives the cycle start packet it starts the transfer of the isochronous data. Here, though the isochronous transfer and the non-synchronous transfer can be mixed, the non-synchronous transfer is not performed till the end of the isochronous transfer. To perform the isochronous transfer certainly, one cycle of the non-transfer is defined under 63.5 $\mu$s.

In FIG. 6, the cycle start packets CSW 1, CSW 2, . . . are transferred in the isochronous cycles 1,2, 3 . . . . The isochronous data are also transferred between the cycle start packets. In FIG. 6, the video data shown right slating lines and the audio data shown left slanting lines are said isochronous data. That is, for example, the video data of channel Ch.0 is transferred just after the cycle start packet, and just after the video data the audio data of channel Ch.6, for example, is transferred. This one pair of the video data and audio data is transferred between each cycle start packet certainly.

After the transfer of the isochronous data are over, the arbitration is carried out and non-synchronous transfer is started during the idle till the cycle start packet is transferred next. In FIG. 6, the transfer of the non-synchronous data is shown by a cross-hatch pattern.

The cycle start packet is transferred after the end of the non-synchronous transfer. So, for example as shown in FIG. 6, the transfer timing of the cycle start packet is sometimes behind from the starting point of the cycle 2. If the delay is great the cycle which does not transfer the non-synchronous transfer data is generated (between the cycle 3 and cycle 4) to guarantees the isochronous transfer.

In FIG. 4, when the isochronous transfer is performed a transmitter 25 packetizes the data from the isochronous transfer buffer 24 by a specific format. A cycle timer 26 outputs the data which shows the cycle time corresponding to one cycle of the isochronous. The transmitter 25 transmits the data within the cycle time.

On the other hand, the receiver 30 receives the cycle star message contained in the cycle star packet, then it transmits the information to the cycle timer 26 via the cycle monitor 29. The receiver 30 inserts a cycle mark packet which shows the end of the isochronous cycle and stores them to the receiving buffer 37. Here, the cycle monitor 29, which is used only the time of isochronous transfer, observes a series of transmitting and receiving operation and sets each state cut-in flag in the register 36.

Next, the operation of the embodiment constructed as described above will be explained.

The RF signals input via the input terminal 1 is supplied to the tuner 2, and the signals of the specific channels are selected. The signals which channels are selected are applied to the decoder 3 and demodulated by demodulating process corresponding the modulation system at the transmitter section. The outputs from the decoder 3 are for example the transport streams of the MPEG 2 standard. The outputs of the decoder 3 are supplied to the error correction decoding circuit 4, and the error correction decoding circuit 4 corrects the error by using the error correction code. Therefor, the TS packet from which the error correction code is eliminated is supplied to the digital input/output block 10 from the error correction decoding circuit 4.

Now, it is assumed that the image reproduction based on broadcast receiving signal is carried out. In this case, the switches SW 1 and 2 selects the terminals b, b according to the input designating signal. So that, the TS packet from the error correction decoding circuit 4 and the valid signal for showing the valid parts of the TS packet are supplied to the TS processor 12.

The TS processor 12 reads-in the valid parts of the TS packets based on the valid signals, and extracts the PMT transmission packet based on the PAT and the program channel designating signals. The TS processor 12 ascertains the correspondence of the PID and the kinds of the transmission data by utilizing the identification table transmitted by the PMT transmission packet, separates each packet by classified and depackets them. The TS processor 12 applies the separated image data to the compressed image decoder 6 as the reproduction output, and applied the audio data to the compressed audio decoder 7 as the reproduction outputs.

The image data and the audio data are decoded respectively in the decoders 6 and 7 of the compressed image and audio signals and supplied to the NTSC/PAL encoder 8 and the PCM and D/A converter 9. The decoded image data are converted into the composite image signals in the TSC/PAL encoder 8 and output. The decoded audio data are converted into the analog audio signals in the PCM and D/A converter 9 and output. These composite image signals and analog audio signals are supplied to display (not shown), so as to visualize the programs selected among the receiving signals.

Next, it is assumed that the receiving data are recorded by the digital VTR connected on the bus (not shown). The packet data which are corrected its error in the error correction decoding circuit 4 are also supplied to the recording program selector 11. The recording program selector 11 extracts only the packet constructing the program which is based on the program channel designating signal from the input packet data by the program channel designating signal based on the user, and outputs the packet to the digital interface 13.

The digital interface of the digital VTT (not shown) carried out the bus arbitration before the transmission of the data. When the bus mastership is accepted the digital VTR issued the data read-out command. If the digital interface 13 receives this read-out command, it take-in the TS packet data from the recording program selector 11.

The TS packet data are input to the transmitter 25 via the isochronous transfer buffer 24, where the TS packet data are performed isochronous transfer. That is, the transmitter 25 ensures the TS packet data transfer per each isochronous cycle by utilizing of cycle time from the cycle timer 26. The transmitter 25 packetizes the TS packet data at the specific format and outputs them to the physical interface 28. The physical interface 28 supplied the packet data to the transfer data encoder 32 via the link interface 31. The packet data encoded in the transfer data encoder 32 are transmitted over bus (not shown) via the cable port 33. The digital VTR (not shown) converts the packet according to the recording format and records them to the specific recording mediums.

Next, it is assumed that the TS packet data recorded in the digital VTR are reproduced and visualized. In this case, the switches SW 1 and SW2 of the digital input/output block 10 select the terminals a, a. The digital interface 13 carries out the bus arbitration and obtains the bus mastership, then it requests the data transfer to the digital VTR. The TS packet from the digital VTR are input to the cable port 33 of the digital interface 13 through the bus and decoded in the receiving data decoder 34.

The decoded TS packet data are supplied to the receiver 30 via the link interface 31 and the physical interface 28. The receiver 30 detects the error of the data by utilizing the CRC circuit 27 and packetizes them, then it stores the defined packet data in the receiving buffer 37. The packet data stored in the receiving buffer 37 are supplied to the terminal a of the switch SW 1. Here, to the terminal a of the switch SW 2 the valid signals for showing the valid portion are supplied. Since the switches SW 1 and 2 have been selecting terminals a, a, the TS packet data from the digital interface 13 and the valid signals are supplied to the TS processor 12.

The TS processor 12 separates the input TS packets by classified and depacketizes them, so as to supply the separated image data to the compressed image decoder 6, and supply the audio data to the compressed audio decoder 7. The following operations are as same as those at the receiving data processing them. Therefore, the image reproduction based on the encoded data recorded in the digital VTR can be carried out.

As described above, in the embodiment, since after depacketizing the outputs from the error correction decoding circuit 4 they are output to the external equipments via the digital interface 13, the TS packetized compressed encoded data can be recorded by the recording reproducing apparatus such as the digital VTR for example. It is possible to prevent the degradation of the signals with the recording of the digital data. Further, it records the TS packetized encoded data it is possible to decrease the recording amount necessary n the external equipment's.

Further, the TS packetized encoded data recorded in the digital VTR are took-in via the digital interface 13 and applied to the TS processor 12 so as to carry out the image reproduction based on the encoded data from the external equipments. Since it demodulates the TS packetized encoded data input from the external equipments it is possible to use inexpensive external equipments without defining the encoder and decoder in the external equipments.

And further, it has switches SW 1 and SW 2 for changing the relieving signals and the signals from the external equipments, it is possible to share the input port of the TS processor 12 and use the TS processor which is not corresponding to the digital input/output as it is.

Further, since it has the recording program selector 11 it can share the information necessary for the TS processor 12 compared with the cased of defining program selector in the external equipment sector. So that it is possible to simplify the structure and to decline the transfer data amounts to the external equipment's.

Figure 7:
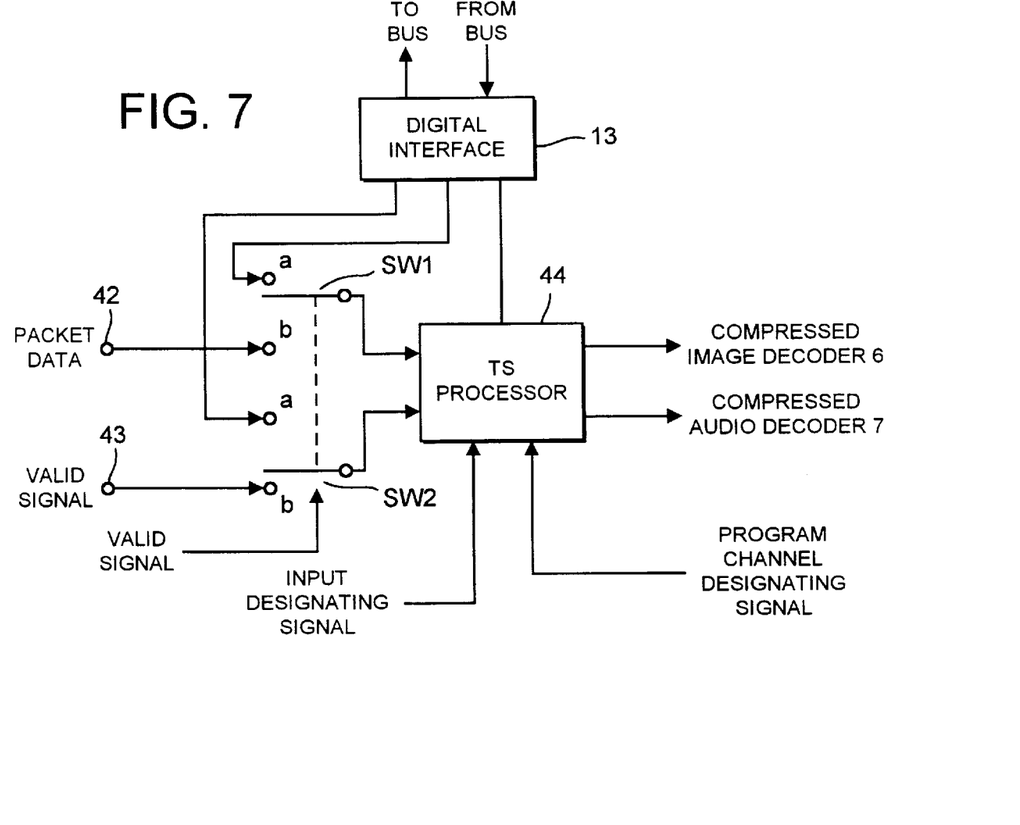
FIG. 7 is a block diagram showing the digital input/output block incorporated in other embodiment.

FIG. 7 is a block diagram showing the digital input/output block incorporated in other embodiment. In FIG. 7 only the digital input/output block structure is different from the embodiment shown in FIG. 1. In FIG. 7 the same components as those shown in FIG. 1 are assigned with the same marks, and the explanations of them are omitted either. In the embodiment by utilizing the program selecting function in the TS processor the recording programs selector 11 is omitted from the digital input/output block.

In this embodiment, the digital input/output block 41 is defined instead of the digital input/output block 10 in the embodiment shown in FIG. 1. In the digital input/output block 41 the recording program selector 11 is eliminated, and a TS processor 44 is defined instead of the TS processor 12.

The packet data from the error correction decoding circuit 4 are input to the an input terminal 42. The valid signals showing the valid portion of the packet data are input to an input terminal 43.

The TS processor 44 identifies the relationship between PID of each stream constructing the designated program and the types of data by referring with the identification table of the PMT transfer packet which is transmitted in the packet having the PID correspondence to the designated program channel number obtained by retrieving the PAT. The TS processor 44 is capable of extracting the identical PID packet in reference with PID from the packet input successively. Therefore, the TS processor 44, to which the program channel designating signals are applied, separates the programs based on the program channel designating signals and depacketizes them so as to provide to the decoders 6 and 7 of the compressed image and audio signals. Further in the embodiment, the TS processor 44 extracts only the packet which constructs the program based on the program channel designating signals and outputs them to the digital interface 13.

In the embodiment constructed as mentioned above, the TS packet correspondent to the MPEG2 standard TS system is input via the input terminal 42 for example. The TS packet data from the input terminal 42 and packet data from the digital interface 13 are applied to each terminals b and a of the switch SW 1. And to the terminals a and b of the switch SW 2 the valid signals are applied to the digital interface 13 or input terminal 43.

Now, it is assumed that the image reproduction of the broadcast signals under receiving is designated by user operation. In this case, both switches SW1 and SW 2 select the terminals b, b. Therefore, the TS packet data and the valid signals based on the receiving signals are applied to the TS processor 44. The TS processor 44 separate the packets corresponding to the program channel designation signals based on the use operation, then it supplies the separated packets to the digital interface, at the same time it depacketizes the separated packets and outputs them.

The outputs from the TS processor 44 are supplied to the decoders 6 and 7 of the compressed image and audio signals. The decoders 6 and 7 of the compressed image and audio signals decode the input encoded data to restore them into the original image data and audio data. Therefore, the image reproduction based on the receiving signals can be carried out.

On the other hand, the digital interface 13 performs the specific converting operation on the input packetized data and outputs them through the bus. The outputs form the digital interface 13 are applied to the digital VTR (not shown), so that the received TS packetized encoded data can be recorded as they are without being decoded.

Other operations are as same as that of embodiment shown in FIG. 1.

As described above, the same effect as in the embodiment shown in FIG. 1 can be obtained in this embodiment. Further, in this embodiment, there is an advantage that the recording program selector 11 can be omitted, so that the circuit scale can be decreased moreover.

Further, in this embodiment, the packet data based on the receiving signal or the packet data from the digital interface 13 are selected by the switches SW1 and SW 2 and visualized, however, by defining the second program channel designating means in the TS processor 41 it is possible to record other programs to the external digital VTR by being output via the digital interface 13 as carrying out the programs on air.

Figure 8:
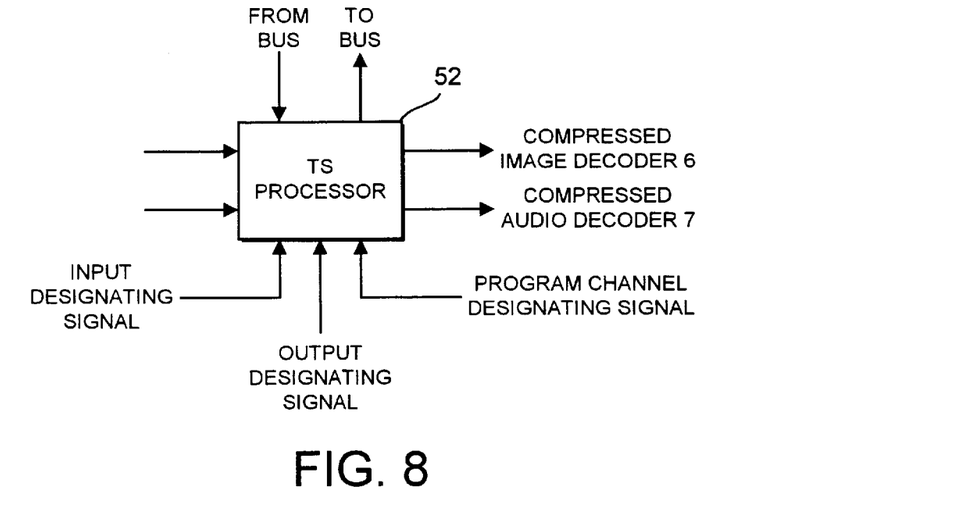
FIG. 8 is a block diagram showing the digital input/output block incorporated in other embodiment.

FIG. 8 is a block diagram showing the digital input/output block incorporated in other embodiment. In FIG. 8 only the structure of digital input/output block differs from the embodiment shown in FIG. 1. In this embodiment, the switches SW 1 and SW 2, the recording program selector 11 and the digital interface 13 are omitted, however, such circuit functions are realized in a TS processor 52.

The TS processor 52 selects a specific types of packet from the input packet data by the program channel designating signal based on the user operation and depacketizes the selected packets. The TS processor 52 outputs the depacketized encoded data to the decoders 6 and 7 of the compressed image and audio signals. Further, the TS processor 52 converts the TS packet data into that corresponding to for example IEEE1394 snf outputs them via the bus(not shown). And conversely, the TS processor 52 can converts the input packet data through the bus into the TS packet data and depacketizes them, then outputs the depacketized TS packet data to the the decoders 6 and 7 of the compressed image and audio signals. The TS processor 52 can selects the packet data of the receiving signals or the packet data from the external equipment by the input designating signal based on the user operation.

Figure 9:
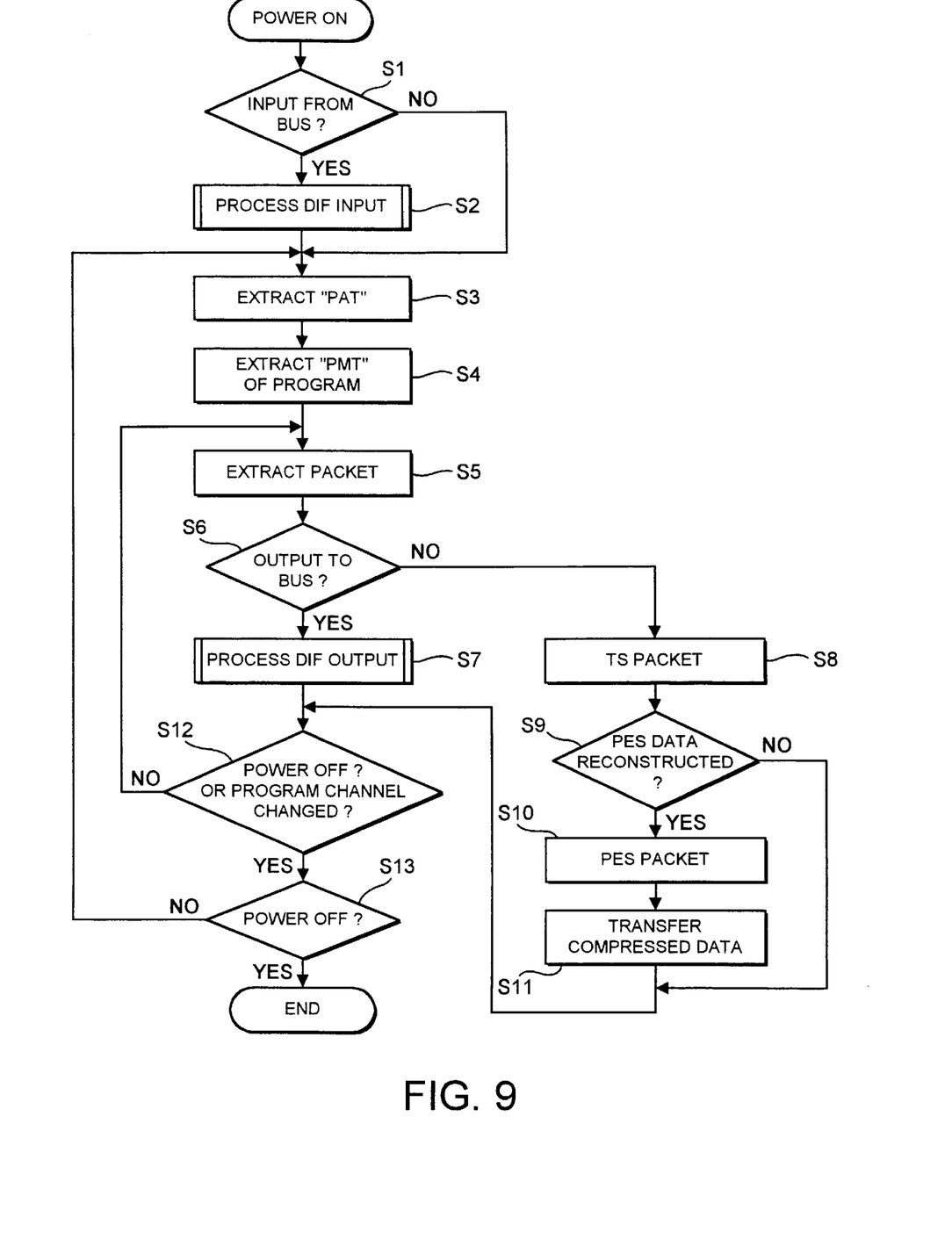
FIG. 9 is a flow chart for explaining the operation of other embodiment.

Next, the operation of the embodiment in such structure as described above is explained referring to the flow chart in FIG. 9. FIG. 9 is showing the processing flow of the TS processor 52.

The TS processor 52, in step S1 in FIG. 9, determines the input packet data whether they are input through the bus or they are based on the receiving signal. In case that the packet data are input through the bus they are performed a DIF (digital interface) input processing in step S2. That is, the TS processor 52 decodes the packet data through the bus and transfers them to the receiving fuffer (not shown), and restores the to the stream of the TS packet data input based on the transferred Time-stamp information. So that, the packet data which are same as that input based on the receiving signal are obtained. If the input packet data are based on the receiving signals the packet data do not take the process of step S2 and moves to the process in step S3.

Next, the TS processor 52 selects the PAT transfer packet of PID at 0 in step S3 and extracts the PAT. PMT section of the program designated is extracted from the PAT in step S4. By referring to the PMT section, it obtains the PID of each stream which constructs the program of the program channel designated by the program channel designating signal based on the user operation. The TS processor 52 extracts each PID packet corresponding to the designated program in next step S5.

Next, the TS processor 52 determines whether it outputs the data to the bus or not in step S6. In case of outputting the data to the bus it performs the DIF output procession in step S7. The said IDF output procession means to convert the extracted packet into the packet corresponding to the IEEE1394 for example and output them. For instance, the TS processor 52 reads-out the TS packet from the transmitting buffer and converts them into the bus packet to which the time stamp information is added, then it encodes them and outputs from bus.

If the data are not output to bus, the processing moves to step S8, where the data outputting operation to the decoders 6 and 7 of the compressed image and audio signals are performed. That is, the TS processor 52 analyzes the header of the extracted TS packet and depacketizes them. By the way, as mentioned above in the MPEG 2 standard TS system, the PES packet is divided and transmitted by a plurality of TS packets. The PES packet is constructed by adding the header information to the image or audio encoded unit data. For instance in case of image data, one PES packet comprises of one flame encoded data.

In step S9, the TS packet data determines whether it can reconstitute the PES packet perfectly or not. If the PESa packet can be reconstituted the header of the PES packet is analyzed and subjected to the PES depacketizing operation in step S10, and output to the decoders 6 and 7 of the compressed image and audio signals in step S11.

In next step S12, it is determined that whether the program channel designation is changed or not, or power supplied is turned OFF or not. If the power supply is not turned OFF and the program channel is not changed either, the processing returns to step S5, and the packet extraction is iterated. Further, in case that the program channel is changed or the power supply is turned OFF, the power supply is determined to be turned OFF in next step S13. If the power supply is not turned OFF the process returns to step S3, and PAT transfer packet is extracted to extract the packet based on the program channel designating signals. When the power supply is detected to be turned OFF a series of process is over.

As described above, the same effect as in the embodiment shown in FIG. 1 can be obtained in this embodiment, at the same time, each processing of digital input/output block an be performed in the TS processor.

By the way, in the embodiment shown in FIG. 8, the TS processor 52, to which only one program channel designating signal is supplied, performs one of the processing for visualizing the input packet data or processing for outputting to the external equipment. However, since it can be possible to supply two program channel designating signal in the TS processor it can output other program to the external equipment and record them as reproducing a program on the air.

Figure 10:
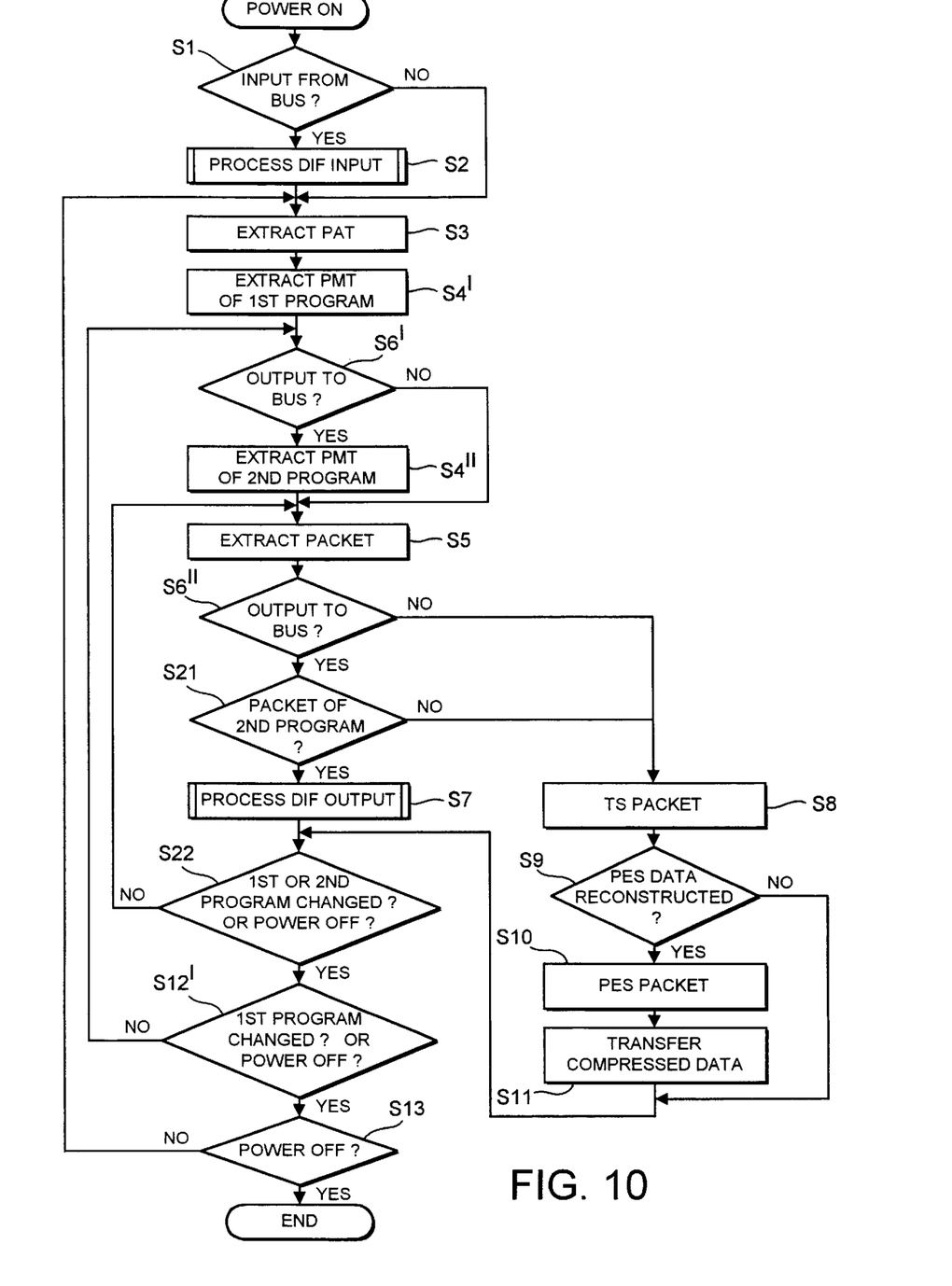
FIG. 10 is a flow chart for explaining the modification of other embodiment.

FIG. 10 is a flow chart for showing the operation flow of the TS processor. In FIG. 10 the same components as those in FIG. 9 are assigned with the same marks and the explanation of them are omitted.

To the TS processor the first and the second program channel designating signals are input. The first program designating signal is for designation the program channel to be visualized. The second program channel designating signal is for designating the program channel to be output to the external equipment.

In step S4', the PMT section of the first program channel designating signal is extracted based on the extracted PAT transfer packet. Next, in step S6', it is determined to be designated to output to the bus or not. If the output to the bus is not designated the process moves to step S5 and it extracts the packet corresponding to the program channel. Next, the process moves to step S8 via step S6' and it is performed the data output procession to the decoders of the compressed image and audio signals.

On the other hand, the output to the bus is designated the process moves to step S4' from step S6', the PNT section of the second program channel designating signal is extracted. In this case, the packets which are corresponding to each first program channel designating signal and the second program designating signal in step S5. Next, the process moves to step S21 via step S6' the packets are determined to be of the second program or not. The second program packet is performed the DIF output processing in step S7, and the first program packet is performed output processing for decoding after step S8.

Next, in step S22, it is determined that the first and second program channels are changed or not, or the power supply is turned OFF or not. If the power supply is not turned OFF and first and second program channels are not changed, the processing moves to step S5, and the extraction of the packet is iterated. If the first or second program channel is changed, or the power supply is turned OFF the procession moves to step S12' and it is determined that the first program is changed or not, or the power supply is turned OFF or not. If the power supply is not changed OFF or the first program channel is changed the processing returns to step S6' and existence or non existence of the output designating to the bus is determined.

Thus, according to the flow shown in FIG. 10, it is possible to output other program to the external equipment and record them as visualizing the predetermined program of the received broadcast signals.

As described above, the digital broadcast receiving terminal apparatus according to the present invention has the effects that the long time recording can be realized without deteriorating the plurality of digital broadcast signals, and it can be constructed inexpensive.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A digital broadcast receiving terminal apparatus, comprising:

digital interface means for converting demodulated digital broadcast signals into digital signals of the same signal formats as predetermined digital signals and outputting them by converting the signal formats between the demodulated digital broadcast signals and the predetermined digital signals, and also for converting the predetermined digital signals into the signals which have the same signal formats as the demodulated digital broadcast signals and outputting them;

transport processing means, where the demodulated digital broadcast signals or the outputs from the digital interface means are input, for selecting predetermined programs from the input signals and demultiplexing them so as to output elements of the selected programs; and decoding means for decoding the outputs of the transport processing means, wherein the digital interface means is provided with means for selecting predetermined programs from the demodulated digital broadcast signals and demultiplexing them so as to obtain elements of the selected programs, and converting the elements into the digital signals which have the same signal formats as the predetermined digital signals and outputting them.

2. A digital broadcast receiving terminal apparatus, comprising:

transport processing means, to which demodulated digital broadcast signals are input, which is able to output elements of predetermined programs selected from the digital broadcast signals and demultiplexed as external outputs by being converted into predetermined signal formats, and to output digital signals having the same signal formats as the external outputs by being converted into signal having the same signal formats as the demodulated digital broadcast signals, for obtaining reproducing outputs from the elements of the predetermined programs selected from the demodulated digital broadcast signals and demultiplexed or obtaining reproduction outputs from the digital signals converted into that having the same signal formats as the demodulated digital broadcast signals; and compression decoding means for decoding the reproducing outputs from the transport processing means, wherein the transport processing means is provided with a first program designating means for selecting programs of the external outputs.

3. A digital broadcast receiving terminal apparatus, comprising:

transport processing means, to which demodulated digital broadcast signals are input, which is able to output elements of predetermined programs selected from the digital broadcast signals and demultiplexed as external outputs by being converted into predetermined signal formats, and to output digital signals having the same signal formats as the external outputs by being converted into signal having the same signal formats as the demodulated digital broadcast signals, for obtaining reproducing outputs from the elements of the predetermined programs selected from the demodulated digital broadcast signals and demultiplexed or obtaining reproduction outputs from the digital signals converted into that having the same signal formats as the demodulated digital broadcast signals; and compression decoding means for decoding the reproducing outputs from the transport processing means, wherein the transport processing means is provided with a first program designating means for selecting programs of the external outputs and a second program designating means for selecting programs of the reproducing outputs.

* * * * *